United States Patent Office 2,995,471
Patented Aug. 8, 1961

2,995,471
METHOD FOR TREATING GRAPHITE PRODUCT
David H. Gurinsky, Rancho Santa Fe, Calif., assignor, by mesne assignments, to the United States of America as represented by the United States Atomic Energy Commission
No Drawing. Filed Dec. 31, 1958, Ser. No. 784,074
12 Claims. (Cl. 117—106)

The present invention relates to an improved graphite or carbon product and more particularly to a graphite or carbon product which is extremely resistant to corrosion and erosion, and also relatively impervious to the passage of gases and vapors, and to a method of making the same.

Graphite and carbon are used in nuclear reactors and the like for structural members and in the containment of nuclear fuels. Although graphite and other forms of carbon are normally quite permeable or porous, it is extremely important in some of such applications that they be rendered as impervious as possible to the passage of vapors and gases such as vaporous fission products and the like.

Various attempts havebeen made to produce dense, relatively impervious graphite. However, despite the fact that carbon and graphite have been made in extremely dense forms, such dense forms usually permit the passage of small amounts of gases and vapors, and therefore are not entirely satisfactory.

Accordingly, it is the principal object of the invention to provide a carbon element having a lower permeability to the passage of gases and vapors, in contrast to conventional carbon bodies.

Other objects and advantages of the invention will become apparent from the following description of the invention. It will be understood that the term carbon in the description covers carbon in any of its forms, e.g., amorphous carbon or graphite, carbon in its crystalline form, etc.

It has been discovered that the permeability of a carbon body can be substantially decreased by treating the carbon body so as to dissolve part of the carbon from the surface thereof and subsequently re-deposit said dissolved carbon over the surface of the body so as to provide a sealing layer which will decrease the permeability of the body to the passage of gases. This can be accomplished in accordance with the present invention, as indicated generally by the figure, by forming an eutectic mixture of metal selected from the group consisting of nickel and iron, and carbon, and utilizing such mixture as the treating composition. After the treating operation, the metal may be removed, leaving the carbon, thereby effectively sealing the pores of the carbon body, so as to impermeabilize the same. Moreover, reduction in permeability takes place without the introduction into the carbon body of foreign substances having a coefficient of expansion or other physical characteristics different from those of the carbon body.

In accordance with the present invention, carbon is deposited on the surface of the carbon body in an improved manner. In this connection, carbon of the carbon body passes into a readily flowable liquid eutectic mixture with nickel or iron or mixtures thereof, and such mixture flows into pores and discontinuities of the carbon body. Thereafter, the metal may be removed, as by conversion to the starting material for the preparation of the eutectic mixture or by other suitable means. This procedure, of course, is carried out in a suitable non-oxidizing atmosphere.

Specifically, material selected from the group consisting of iron carbonyl and nickel carbonyl and mixtures thereof, preferably nickel carbonyl, is utilized as the starting material in the preparation of the desired nickel-carbon or iron-carbon liquid eutectic mixture.

Nickel carbonyl has the formula $Ni(CO)_4$. This compound has a melting point of minus 25° C. and a boiling point of 43° C. The vapor begins to decompose at 60° C. to form nickel and carbon monoxide. Nickel carbonyl is commercially available and may be prepared by passing carbon monoxide over nickel, preferably in powdered form, at a suitable temperature below the decomposition point of the vapor.

The nickel carbonyl is disposed in gaseous form in an evacuated zone, for example, a sealed retort, preferably in contact with the carbon body to be treated. For example, liquid nickel carbonyl and a carbon body can be sealed in a retort and heated to a temperature above the boiling point of the nickel carbonyl. Alternatively, gaseous nickel carbonyl can be introduced, as by flushing, into a treating chamber containing the carbon body until the chamber has an atmosphere which consists essentially of the gaseous nickel carbonyl.

The carbon body is then heated to a temperature above the decomposition point of the nickel carbonyl and is contacted with nickel carbonyl vapor, the surface of the hot carbon body acting to decompose the carbonyl and yield nickel and carbon monoxide. The carbon body is then heated to a temperature at which liquid eutectic mixture of nickel and carbon forms on the surface of the carbon body from nickel of the decomposed carbonyl and carbon from the carbon body.

The carbon monoxide which is formed acts as a protective atmosphere for the eutectic after formation at the eutectic-forming temperature. For example, a temperature of about 1300° C. or more may be employed to attain initial softening and interdiffusion of carbon and metal. A low melting nickel-carbon eutectic is formed at 1318° C., as shown on page 1183 of The Metals Handbook, 1948 Edition, published by The American Society for Metals, 1948. The liquid eutectic mixture is formed and maintained by heating the deposited nickel and diffused carbon to a temperature above the melting point thereof, whereby carbon dissolution occurs and the eutectic mixture is formed. At any rate, the treating temperature should be maintained below the carburizing temperature for nickel, that is, below the temperature where carburizing proceeds at a substantial enough rate to interfere with the process by providing the formation of substantial concentrations of carbides in and on the carbon body.

The treating temperature above the melting point of the eutectic mixture causes the liquid mixture to flow over the surface and into any discontinuities on the surface of the carbon body.

When the eutectic mixture is evenly distributed over the surface to be treated, the carbon body is then cooled to room temperature. During such cooling, carbon comes out of solution in the eutectic mixture and is deposited on the carbon body to effectively seal the carbon body. Metallic nickel is, of course, formed on the surface of the treated carbon body.

If desired, the treated carbon body can be utilized as is, that is with the surface sealed with carbon, and with the nickel deposited thereon. However, it is preferred to remove the nickel so as to preserve the purity of the carbon body.

The nickel can be removed from the treated carbon body in any desired manner. A preferred method is flushing the carbon body with carbon monoxide at a temperature which promotes the formation of nickel carbonyl, that is, at a temperature below the decomposition point of nickel carbonyl. The formed nickel carbonyl may be collected for re-use.

As an example of the method of the present invention, nickel carbonyl gas is used to flush a retort containing a hollow graphite tube maintained at a temperature of 200° C. The nickel carbonyl decomposes on the surface of the tube and deposits nickel. After the desired amount of nickel is deposited, the retort is sealed and heated slightly in excess of 1318° C., a temperature substantially below that at which carburization of nickel occurs at a substantial rate but which will form a liquid nickel-carbon eutectic. After the eutectic has formed over the graphite surface for a relatively short period of time, the graphite is then cooled to room temperature. The treated graphite tube is then placed in a suitable chamber and flushed with carbon monoxide at a temperature below about 60° C. until substantially free of nickel. The resulting treated graphite tube has decreased permeability to volatilized fission products and to other gases and vapors and, moreover, has a substantially uniform, non-porous surface structure.

It should be understood that iron carbonyl in any one or more of its several forms can be added to or substituted for the nickel carbonyl in the method of the present invention, although nickel carbonyl is preferred. Iron carbonyl may be in the tetra form, $Fe(CO)_4$, or penta form, $Fe(CO)_5$, or in a third form, $Fe_2(CO)_9$. The tetra form has a melting point of 140 to 150° C., while that of the penta form is $-21°$ C. and that of the third form is 100° C. The penta form has a boiling point of 102.8° C. and a decomposition point of 200° C.

In the event that iron carbonyl is utilized instead of nickel carbonyl in the method of the present invention, the temperature conditions are suitably adjusted to provide gaseous iron carbonyl, followed by decomposition thereof to form iron and carbon monoxide at, for example, a temperature above 200° C. Upon continued heating to a suitable temperature above the melting point for the iron-carbon eutectic mixture formed from the iron and carbon of the carbon body, the eutectic flows over the surface of the carbon. The high temperature should be below that at which carburization of the iron would occur at a substantial rate, for example, below about 1500 to 1600° C. The carbon body is then cooled and the iron is preferably removed therefrom at a temperature below the decomposition point of iron carbonyl. This is preferably accomplished by the formation of iron carbonyl in situ and removal of the iron carbonyl as a gas from the carbon body, as in the case of the nickel carbonyl.

The method of the present invention provides in a simple manner an improved carbon product which has a reduced permeability to gases and vapors. The treatment of the carbon product is carried out while retaining the purity and integrity of the product. Other objects and advantages are as set forth in the foregoing.

Such modifications in the method of the present invention, in the materials and equipment for carrying out the method, and in the products thereof as are within the skill of those versed in the art are contemplated as being within the scope of the present invention.

Various features of the present invention which are believed to be new are set forth in the appended claims.

I claim:

1. A method of treating a carbon body which comprises the steps of forming a liquid eutectic mixture of carbon and metal selected from the group consisting of nickel, iron and mixtures thereof on the surface of a carbon body at an elevated temperature, and thereafter cooling the carbon body, whereby carbon is precipitated from said eutectic mixture.

2. A method of treating a carbon body which comprises the steps of forming a liquid eutectic mixture of carbon and metal selected from the group consisting of nickel, iron and mixtures thereof on the surface of a carbon body at an elevated temperature, thereafter cooling the carbon body, whereby carbon is precipitated from said eutectic mixture, and thereafter removing said metal from said carbon body.

3. A method of treating a carbon body which comprises the steps of forming a liquid eutectic mixture of carbon and nickel on the surface of a carbon body at an elevated temperature below that at which substantial carburization occurs, and thereafter cooling the carbon body, whereby carbon is precipitated from said eutectic mixture.

4. A method of treating a carbon body which comprises the steps of forming a liquid eutectic mixture of carbon and nickel on the surface of a carbon body at an elevated temperature below that at which substantial carburization occurs and thereafter cooling the carbon body, whereby carbon is precipitated from said eutectic mixture, and passing carbon monoxide into contact with said carbon body at a suitable temperature, whereby carbonyl of said metal is formed in situ and removing said carbonyl from said carbon body as a gas.

5. A method of treating a carbon body which comprises the steps of flowing a liquid eutectic mixture of carbon and iron on the surfece of a carbon body at an elecated temperature below that at which substantial carburization occurs, and thereafter cooling the carbon body, whereby carbon is precipitated from said eutectic mixture.

6. A method of treating a carbon body which comprises the steps of forming a liquid eutectic mixture of carbon and iron on the surface of a carbon body at an elevated temperature below that at which substantial carburization occurs, and thereafter cooling the carbon body, whereby carbon is precipitated from said eutectic mixture, and passing carbon monoxide into contact with said carbon body at a suitable temperature, whereby carbonyl of said metal is formed in situ and removing said carbonyl from said carbon body as a gas.

7. A method of treating a carbon body which comprises the steps of preparing carbonyl of metal selected from the group consisting of nickel, iron and mixtures thereof, decomposing said carbonyl in a non-oxidizing atmosphere into a mixture of said metal and carbon monoxide on the surface of a carbon body heated to a temperature above the decomposition point of said carbonyl, increasing the temperature of said carbon body to a point above which the metal passes into a liquid phase, whereby a liquid eutectic mixture of said metal and carbon of said carbon body is formed on the surface thereof, maintaining said elevated temperature whereby said liquid mixture flows over the surface of said carbon body, thereafter allowing said carbon body to cool to below the decomposition temperature of the carbonyl of said metal and to a temperature suitable for forming a carbonyl of said metal and then contacting said carbon body with carbon monoxide at said carbonyl-forming temperature, whereby carbonyl of said metal is formed in situ in and on said carbon body, and removing said carbonyl from said carbon body by gasifying the carbonyl.

8. A method of treating a carbon body which comprises the steps of preparing carbonyl of metal selected from the group consisting of nickel, iron and mixtures thereof, decomposing said carbonyl in a non-oxidizing atmosphere into a mixture of said metal and carbon monoxide on the surface of a carbon body heated to above the decomposition point of said carbonyl, increasing the temperature of said carbon body to an elevated temperature above the point at which a liquid eutectic mixture of said metal and carbon of said carbon body is formed at said surface and below that at which substantial carburization occurs, maintaining said elevated temperature whereby said liquid mixture flows over the surface of said carbon body, thereafter allowing said carbon body to cool to below the decomposition temperature of the carbonyl of said metal and to a temperature suitable for forming the carbonyl of said metal and then contacting said carbon body with carbon monoxide at said carbonyl-forming temperature, whereby carbonyl of said metal is formed in situ in and on said carbon body, and removing said carbonyl from said carbon body by gasifying the carbonyl.

9. A method of treating a carbon body which comprises the steps of preparing a carbonyl of nickel, decomposing said carbonyl in a non-oxidizing atmosphere into a mixture of said nickel and carbon monoxide on the surface of a carbon body heated to above the decomposition point of said carbonyl, increasing the temperature of said carbon body to a point above which the metal passes into a liquid phase, whereby a liquid eutectic mixture of said nickel and carbon of said carbon body is formed on the surface thereof, maintaining said elevated temperature whereby said liquid mixture flows over the surface of said carbon body, thereafter allowing said carbon body to cool to below the decomposition temperature of the carbonyl of nickel and to a temperature suitable for forming the carbonyl of nickel and then contacting said carbon body with carbon monoxide at said carbonyl-forming temperature, whereby carbonyl of said nickel is formed in situ in and on said carbon body, and removing said carbonyl from said carbon body by gasifying the carbonyl.

10. A method of treating a carbon body which comprises the steps of preparing carbonyl of nickel, decomposing said carbonyl in a non-oxidizing atmosphere into a mixture of said nickel and carbon monoxide at the surface of a carbon body, increasing the temperature of said carbon body to an elevated temperature above the point at which a liquid eutectic mixture of said nickel and of said carbon body is formed and below that at which substantial carburization occurs while maintaining said nickel and carbon monoxide in contact therewith, whereby a liquid eutectic mixture of said nickel and carbon of said carbon body is formed on the surface thereof, maintaining said elevated temperature whereby said liquid mixture flows over the surface of said carbon body, thereafter allowing said carbon body to cool to below the decompositon temperature of the carbonyl of nickel and to a temperature suitable for forming the carbonyl of nickel and then contacting said carbon body with carbon monoxide at said carbonyl-forming temperature, whereby carbonyl of said nickel is formed in situ in and on said carbon body, and removing said carbonyl from said carbon body by gasifying the carbonyl.

11. A method of treating a carbon body which comprises the steps of preparing carbonyl of iron, decomposing said carbonyl in a non-oxidizing atmosphere into a mixture of said iron and carbon monoxide on the surface of a carbon body heated to above the decomposition point of said carbonyl, increasing the temperature of said carbon body to a point above which the metal passes into a liquid phase, whereby a liquid eutectic mixture of said iron and carbon of said carbon body is formed on the surface thereof, maintaining said elevated temperature whereby said liquid mixture flows over the surface of said carbon body, thereafter allowing said carbon body to cool to below the decomposition temperature of the carbonyl of iron and to a temperature suitable for forming the carbonyl of iron and then contacting said carbon body with carbon monoxide at said carbonyl-forming temperature, whereby carbonyl of said iron is formed in situ in and on said carbon body, and removing said carbonyl from said carbon body by gasifying the carbonyl.

12. A method of treating a carbon body which comprises the steps of preparing carbonyl of iron, decomposing said carbonyl in a non-oxidizing atmosphere into a mixture of said iron and carbon monoxide on the surface of a carbon body heated to above the decomposition point of said carbonyl, increasing the temperature of said carbon body to an elevated temperature above the point at which a liquid eutectic mixture of said iron and carbon is formed and below that at which substantial carburization occurs while maintaining said iron and carbon monoxide in contact therewith, whereby a liquid eutectic mixture of said iron and carbon of said carbon body is formed on the surface thereof, maintaining said elevated temperature whereby said liquid mixture flows over the surface of said carbon body, thereafter allowing said carbon body to cool to below the decomposition temperature of the carbonyl of iron and to a temperature suitable for forming the carbonyl of iron and then contacting said carbon body with carbon monoxide at said carbonyl-forming temperature, whereby carbonyl of said iron is formed in situ in and on said carbon body, and removing said carbonyl from said carbon body by gasifying the carbonyl.

References Cited in the file of this patent

UNITED STATES PATENTS

| 2,719,094 | Clough et al. | Sept. 27, 1955 |
| 2,798,051 | Bicek | July 2, 1957 |
| 2,930,106 | Wrotnowski | Mar. 29, 1960 |

OTHER REFERENCES

Metals Handbook, 1948 Edition, published by The American Society for Metals, 1948. Page 1183.